(12) United States Patent
Devriendt et al.

(10) Patent No.: US 8,062,802 B2
(45) Date of Patent: Nov. 22, 2011

(54) FUEL CELL HEAT EXCHANGE SYSTEMS AND METHODS

(75) Inventors: James Devriendt, Hove (GB); Robert Morgan, Shoreham by Sea (GB); Paul Barnard, Worthing (GB); Robert Leah, Croydon (GB)

(73) Assignee: Ceres Intellectual Property Company Limited, Crawley, West Sussex (GB)

( * ) Notice: Subject to any disclaimer, the term of this patent is extended or adjusted under 35 U.S.C. 154(b) by 959 days.

(21) Appl. No.: 11/932,925

(22) Filed: Oct. 31, 2007

(65) Prior Publication Data

US 2008/0118800 A1 May 22, 2008

Related U.S. Application Data

(60) Provisional application No. 60/869,715, filed on Dec. 12, 2006, provisional application No. 60/943,508, filed on Jun. 12, 2007.

(30) Foreign Application Priority Data

Nov. 1, 2006 (GB) .................................. 0621784.8
Jun. 8, 2007 (GB) .................................. 0711108.1

(51) Int. Cl.
*H01M 8/40* (2006.01)
(52) U.S. Cl. ........................................ 429/435; 429/440
(58) Field of Classification Search .................. 429/435, 429/440; 165/140
See application file for complete search history.

(56) References Cited

U.S. PATENT DOCUMENTS

| | | | |
|---|---|---|---|
| 4,001,041 A | 1/1977 | Menard | |
| 4,128,700 A | 12/1978 | Sederquist | |
| 5,212,023 A | 5/1993 | Diethelm | |
| 6,312,842 B1 | 11/2001 | Reiser et al. | |
| 6,432,565 B1 * | 8/2002 | Haines | 429/416 |
| 7,131,488 B2 * | 11/2006 | Ozaki | 165/140 |
| 2003/0224238 A1 | 12/2003 | Finn et al. | |
| 2004/0048120 A1 | 3/2004 | Haltiner et al. | |
| 2004/0151959 A1 | 8/2004 | Formanski et al. | |
| 2005/0118474 A1 | 6/2005 | Ettwein et al. | |
| 2005/0181247 A1 | 8/2005 | Foger et al. | |

FOREIGN PATENT DOCUMENTS

| | | |
|---|---|---|
| EP | 0170277 A | 2/1986 |
| EP | 0580918 A1 | 2/1994 |
| EP | 0 948 070 A1 | 10/1999 |
| EP | 1037296 | 9/2000 |
| EP | 1 172 874 A2 | 1/2002 |
| EP | 1 347 529 A2 | 9/2003 |
| GB | 2436396 A | 9/2007 |
| JP | 2003-257457 A | 9/2003 |
| JP | 2004-234862 A | 8/2004 |
| WO | WO 99/10945 | 3/1999 |
| WO | WO 03/065488 A1 | 8/2003 |

* cited by examiner

*Primary Examiner* — Stephen J. Kalafut
(74) *Attorney, Agent, or Firm* — Miles & Stockbridge P.C.

(57) ABSTRACT

A system and method are provided for exchanging heat in fuel cell systems (100) in which the anode and cathode off-gases are provided with separated flow paths. In one embodiment, where a fuel cell stack (110) has separate anode and cathode off-gas flow paths, separate anode off-gas from the at least one fuel cell stack (110) and at least one heat transfer fluid are passed through a first heat exchange element (126) to exchange heat between the anode off-gas and the heat transfer fluid. The cathode off-gas exiting the at least one fuel cell stack is then combined with the anode off-gas from the heat exchange element (126) in a burner and burned.

40 Claims, 9 Drawing Sheets

FUEL CELL HEAT EXCHANGE SYSTEMS AND METHODS

CROSS-REFERENCE TO RELATED APPLICATION

This application claims the benefit of U.S. Provisional Application No. 60/869,715 filed Dec. 12, 2006, and U.S. Provisional Application No. 60/943,508 filed Jun. 12, 2007, both incorporated herein by reference. This application also claims the priority of United Kingdom Application No. 0621784.8 filed Nov. 1, 2006, and United Kingdom Application No. 0711108.1 filed Jun. 8, 2007, both incorporated herein by reference.

FIELD OF THE INVENTION

The present invention relates to energy management within fuel cell systems. In particular, the present invention relates to heat exchange systems and methods within fuel cell systems.

BACKGROUND OF THE INVENTION

Solid-Oxide Fuel Cell (SOFC) systems operate efficiently by converting the energy contained in a fuel stream into usable heat and electricity. Heat recovery in SOFC systems is commonly achieved by the use of heat exchangers (for example, shell and tube, plate and fin and micro channel) in a variety of flow configurations (multi-stream, counter flow, co-flow, cross flow). Some of the fluid streams in the system are liquid and some are gas, of which some contain water vapour. The SOFC system efficiency can be derived from comparing the potential energy contained in the fuel stream entering the system to the total usable heat and power produced by the system and available to the user. Overall SOFC system efficiency is important as it impacts on the commercial viability of the SOFC, system product in the chosen application market. Thermal and electrical losses are important in determining the overall SOFC system efficiency. Management of heat and mass transfer within the SOFC system influences the magnitude of thermal and electrical losses.

A SOFC itself operates by converting the energy in the fuel into heat and electricity using an electrochemical process. The efficiency of that process is dependent on several factors, including the concentration of the fuel on the fuel side of the fuel cell, partial pressure of oxygen on the air side of the fuel cell, and the temperature of the fuel cell.

In order to operate, the fuel cell consumes fuel and consumes oxygen in the air in the electrochemical reaction. In addition to the electricity generated by this reaction, excess thermal energy is created by the electrochemical process in the region of the fuel cell active area. To maintain the energy conversion process, fuel and air need to be supplied to the fuel cell and heat needs to be removed from the fuel cell. Commonly, the heat generated by the fuel cell reaction is partly consumed keeping the fuel cell itself and its surrounding environment at operating temperature, and the majority of the remaining heat is removed from the fuel cell using the air stream, and/or the fuel exhaust stream.

In general, an operating fuel cell does not consume all the fuel in the fuel stream, and likewise does not consume all the oxygen in the air stream. As the fuel cell does not fully consume the fuel and the oxygen in air, there must be a method of removing the depleted fuel stream (commonly termed the anode off-gas) and the altered air stream (commonly called the cathode off-gas) from the fuel cell active area. Thus, fuel is fed to and removed from the fuel cell active area, and air is fed to and removed from the fuel cell active area.

To achieve effective energy conversion by the fuel cell, a fuel reformer may be included in the fuel supply line before the fuel cell or reformation may occur internally to the fuel cell stack, to reform the hydrocarbon based fuel into a hydrogen rich stream before the fuel gas reached the fuel cell.

SOFCs operate effectively at a specified operating temperature, often over a range of temperatures around the specified operating temperature. This effective operating temperature is typically set by the type of material used in the fuel cell active layers—e.g. 720-950° C. for YSZ, 500-650° C. for CGO.

For SOFCs, the incoming air and fuel streams may be heated to about the fuel cell operating temperature before the streams reach the fuel cell active area. This improves the operating efficiency of the fuel cell and reduces the temperature gradients, and hence thermal stresses, that the fuel cell would undergo if ambient temperature fluids were to come in contact with the hot 500-900° C. fuel cell structures. Efficiency is also improved due to improved thermal balancing of the cell to the optimal operating temperature range. Because of the high operating temperatures, the fuel stream is normally a gas at or close to the point where it meets the fuel cell active area.

Heat energy may be extracted form the gas streams exiting the fuel cell active area (anode and cathode off-gasses) and used to heat the fuel and air streams entering into the fuel cell active area. This is generally achieved by mixing the fuel cell exhaust fuel stream (which contains chemical energy in the form of unused fuel) and the fuel cell exhaust air stream and burning the resultant mix very close to the fuel cell stack (as shown in U.S. Pat. No. 5,212,023 and EP1037296) and using the heat generated by this process to pass, via a heat exchanger, to the incoming air stream.

When fuel cell systems are fed with hydrocarbon fuels it is not uncommon for a fuel reformer to be placed in the fuel stream ahead of the fuel cell stack in order to facilitate the reformation of the hydrocarbon fuel into constituent parts: hydrogen, carbon dioxide, carbon monoxide and other elements. There are several reforming methods suitable for fuel cell use which are known and are thus are not detailed herein. Typical reforming methods include auto-thermal reforming (ATR), steam reforming (SR), water gas-shift reforming (WGS) and partial oxidation reforming (POX or CPOX).

In overview, for effective reformer operation, there are some methods of reforming that do not require water to be added to the fuel stream to operate (e.g. CPOX), and there are those that do require water to be added (e.g. ATR, SR, WGS).

Non-water reformer types, such as CPOX, do not require a water supply unit to be part of the fuel cell system. To one skilled in the art, it will be understood that such non-water added systems produce a lower hydrogen concentration in the reformed fuel stream than is provided from water added systems, which produce a richer hydrogen fuel stream.

For optimum fuel cell operating efficiency, the reforming options using steam offer considerably greater gains in the potential operating efficiency. In systems seeking such efficiency, water is added in the system to produce steam. The steam can be provided from the water content in the fuel side exhaust stream and/or from a water store or water source. At system start up from ambient temperature, there may not be steam directly available in the system from the fuel side exhaust stream, and thus the steam may be generated from a water store using a steam generator.

In some applications, there is a requirement to heat an external load—for instance a hot water store. Thus some of the heat generated by the SOFC system can be used to provide for this heating requirement.

SUMMARY OF THE INVENTION

Aspects of the invention seek to provide at least one or more, possibly integrated, heat exchange elements for a fuel cell system that is/are arranged to transfer heat between the exhaust stream of at least one of the fuel cell stack fuel side and the air side exhaust streams, which are separated into separate anode and cathode off-gases. In aspects of the invention, the transfer is to transfer heat from the exhaust stream(s) to air and fuel streams being fed into the fuel cell stack, whilst also, in some aspects of the invention, transferring heat to an external thermal load such as a heat receiving device e.g. thermal store and/or a heat rejection device e.g. a radiator and/or a heat transfer device e.g. a heat pump or Stirling Engine. Condensing out of water from the exhaust stream(s) e.g. either or both of the anode off-gas and the cathode off-gas may also occur, for additional transfer of heat. The energy from the unused fuel in the anode off-gas may also be utilised by burning the unused fuel gas to generate heat. In an aspect, this heat is fed back into the fuel cell system. In another aspect the fuel cell system receives heat from another source (e.g. a reformer placed beside an automotive exhaust system, or turbine exhaust) and the heat generated by burning the unused fuel gas is used for other purposes outside the fuel cell system.

In aspects of the invention, the order of the separate fluid feeds to the heat exchange elements, the arrangement and combination of heat exchange element(s) and/or the controllability of the fluid feeds allow for sufficient heat energy to be returned to the fuel cell system for sustained operation, and are advantageous and improve system operation and efficiency, whilst allowing for condensing of water vapour to occur independently, from at least one of the anode off-gas and from the cathode off-gas streams to maximise heat recovery for non-fuel cell system heat load use.

In aspects of the invention, the order and placement of the heat exchange elements (which may be condenser heat exchange elements) is set by the requirement to improve the transfer of heat energy from the fuel cell stack hot exhaust gases to the cold incoming fluids, and to condense out as much steam as possible from the anode and/or the cathode off-gas exhaust streams (which may be at a stage after combination and combustion of the anode and cathode off-gases to form a burner off-gas) in order to capture the latent heat energy and to recover the condensed water for use in the system and/or elsewhere. For an SOFC system, the maximum amount of water vapour available by volume generally occurs in the anode off-gas stream. Thus this stream is, in energy terms, the most effective combined source of heat and condensed water recovery. Therefore, in an aspect, this stream undergoes the most effective condensing process. If the system involves a single circulating heat transfer fluid, then for this to occur an anode off-gas condenser heat exchange element for the condensing of water from the anode off-gas is placed such that it receives the lowest temperature heat transfer fluid (e.g. cooling water circulating from a thermal store) ahead of any other condensing heat exchange elements that are included in the sane heat transfer fluid circuit.

For purposes of clarity, a condenser heat exchange element or condenser heat exchanger is defined here as a heat exchanger that is designed so that when it is operating it may condense water out of one of the streams passing through the heat exchanger unit.

The anode off-gas comprises unconverted fuel, heat energy and water vapour. It is advantageous to recover as much of this energy as possible by recovering the thermal energy in the stream, which also includes recovering the latent heat contained in the water vapour carried in the stream, and recovering the chemical energy in the unburnt fuel carried in the stream.

When condensing the anode off-gas to recover the latent heat energy and the water vapour as liquid, a significant temperature drop in the anode off-gas stream must be achieved—depending on operating conditions, dropping the stream temperature to significantly below 100° C., e.g. 50° C. or lower. By removing this much heat energy from the anode off-gas stream, the majority of the heat energy carried in the stream goes to the heat transfer fluid and only a small amount of heat energy remains in the anode off-gas stream. Assuming the heat transfer fluid is water, unless the water is pressurised, it can only generally be heated up to 100° C., though more normally 50-85° C. At these temperatures, the water might not be able to be used as a high temperature energy source to effectively feed this energy back into the fuel cell system, which is at a higher temperature than this flow heated water; thus the heat may be exported to the thermal load or store, for use as a heat source, for example in a domestic heating system.

Removing the latent heat energy and the condensed water from the anode off-gas stream may affect the thermal efficiency of the fuel cell system. Therefore, according to an aspect of the invention, a fuel cell set-up is provided, where by at least some of the heat energy is transferred from the anode off-gas by a further heat exchange element, before it reaches a condenser heat exchanger. This heat energy, transferred before reaching the condensing heat exchanger, can be passed back into to the fuel cell stack system using one of the lower temperature fluid feeds entering into the fuel cell stack system, such as the air side freed. As the fluid feeds to the stack are mainly gases, and the anode off-gas is a gas, the further heat exchange element may be a gas-to-gas heat exchanger. Thus, in aspects, it is possible to transfer some of the anode off-gas thermal energy to the fuel cell stack incoming air stream, thus heating it before it enters the fuel cell stack on the cathode side.

As some of the thermal energy is removed from the anode off-gas stream by the further (gas-to-gas) heat exchange element in aspects of the invention, which may be an air heater heat exchange unit, the size and operational requirements of the heat exchange element, which may be a gas-to-water condenser heat exchanger, to which the anode off-gas flows after passing through the further heat exchanger, can be reduced. This may allow a reduced heat transfer fluid circuit volume and a smaller heat transfer fluid pump (and so reducing the fuel cell system electrical parasitic load). In addition, the required size of the thermal store and or the thermal radiator may be reduced, which may provide for a more compact system.

In an aspect of the invention, a burner is provided for mixing and burning the anode and cathode off-gases. The burner then outputs burner off-gas. A second heat exchange element, for recovering heat from this burner off-gas is provided in aspects of the invention, and this may make use of the same heat transfer fluid as the anode off-gas condenser heat exchange element. The heat transfer fluid may have passed through the first (anode off-gas) heat exchange element before passing through the second (burner off-gas) heat exchange element, which in aspects of the invention is referred to as a fuel cell heat recovery heat exchanger, so that the anode off gas exchanges heat with heat transfer fluid before the heat transfer fluid is heated further in the fuel cell heat recovery heat exchanger. This may be beneficial where the anode off-gas contains a greater proportion of steam and water vapour than the burner off-gas.

As the cathode off-gas generally contains less water vapour than the anode off-gas, there is marginal benefit from attempting to recover the small amount of energy associated with the cathode off-gas water vapour when compared with that available from condensing out the anode off-gas water vapour. Thus water vapour in the cathode off-gas might not be condensed out. Therefore, the cathode off-gas exiting the fuel cell is fed to the burner as the after-burner oxidant feed, i.e. a heat exchanger does not need to be provided in the cathode off-gas stream between the fuel cell and the burner. The cathode off-gas exiting the fuel cell may be fed directly to the burner, and there may be no significant heat loss from the cathode off-gas. The higher temperature cathode off-gas feed to the burner assists in maintaining a high burner temperature. This feature allows the oxidant feed for the burner to be input without being heated, which means that there is more thermal energy available in the burner off-gas, which can be used in embodiments to heat a fuel reformer. In particular, combination of a relatively low water vapour content heat exchanged anode off-gas feed into the burner with a relatively high temperature cathode off-gas allows the burner to operate at a higher temperature, so that an endothermic reformer unit thermally connected to the burner off-gas stream can be operated without additional heat input. Such an arrangement may mean that no additional burner is required to heat the reformer, no additional fuel supply is required during at temperature operation of the reformer and/or the unburnt fuel percentage of the anode off-gas need not be increased. Alternatively, the second heat exchanger may be provided before the burner and cool the cathode off-gas before it is burned. An additional heat exchanger may be provided between the fuel cell stack producing the cathode off-gas, and the burner.

In an aspect of the invention, the burner off-gas may be passed through another heat exchange element, before it reaches the second heat exchange unit, which may occur for similar reasons to passing the anode off-gas through a further heat exchange element before passing it through the first heat exchange element.

The relative sizes and energy transfer characteristics of the provided heat exchange elements (which may include one or more of first and second heat exchange elements (which may be condensing), the further heat exchange element (which may be gas to gas), and/or the other heat exchange element between the burner and the second heat exchange element) can be balanced to achieve good thermal transfer from the anode off-gas to the incoming air, whilst allowing condensation heat recovery to occur and so achieve good thermal recovery to the heat sink or heat load.

By reclaiming water from the off-gas(es) in the system, a self sufficient system can be provided in terms of water usage. The water received from the off-gas(es) can be used in a reforming process for the fuel, prior to entry into the fuel cells. Such a system reduces water consumption, as water is reclaimed and re-used. In remote locations, the need for a separate water supply may be removed completely.

Whilst the invention and layouts are not limited to one application, the intermediate temperature operation (400-650° C.) of the applicant's fuel cell technology (as shown in GB2368450—incorporated herein in its entirety by reference), when compared with high temperature designs operating above 700° C., means that the system components that are exposed to the high temperature fluids can be made from non-exotic metals, allowing for a more flexible system design and the resulting selection of lower specification and, lower cost materials for system components. Such materials include the use of stainless steel components for the fuel cell support and the bi-polar plates, meaning that the anode fuel-side seal can be simply be achieved by welding the fuel cell support plate to the adjoining bi-polar plate. The air side seal can simply be achieved by the use of a compression gasket, made from a material such as vermiculite. Additionally, the intermediate operating temperatures of the system components and fluid streams allow for a closely thermally coupled and thermally integrated design. This results in reduced system cost and complexity.

The closely coupled heat exchanger arrangement of aspects of the present invention can be applied to a variety of applications, including combined cooling and power, tri-generation (combined heating, cooling and power generation), stationary power generation and auxiliary power production. Aspects of the present invention are particularly useful in combined heat and power systems, and grid independent power supplies. The rate of heat removed from the SOFC system to the thermal store or the thermal load may be controlled by at least one circulation pump, which allows for a degree of control of the amount of energy taken out of the system by the condenser heat exchange elements, and hence the amount of energy available to be fed back into the system, and also the degree of condensing that can be achieved.

In a set-up according to an aspect of the invention of at least two heat exchange elements, these can be combined into the same unit, thus providing a more cost effective and efficient unit. Further, where there are reduced fluid connections, simpler packaging and a lighter overall unit can be achieved.

In a further aspect of the invention, at least the anode off-gas condenser heat exchange element can be fed with more than one heat transfer fluid. For example, some of the heat transferred from the anode off-gas can be fed to the fuel cell system fuel supply, and the amount of heat transferred is partially controlled by the flow of fuel, which is set by the application power requirements, and also by controlling the flow rate of the other heat transfer fluid, say through a circulation pump in a thermal absorption/release system. The heat transfer fluids used can be varied and the performance and hence design of the heat exchanger will be determined in part by the heat transfer fluid flow rates as well as the heat capacity of the heat transfer fluid. Such fluids could include water either in a closed circulation system or an open circulation system, refrigerants (for example from an absorption chiller), fuels (for example from a vehicle or piped gas), or air.

In aspects of the invention, the temperature of operation of the fuel cell(s) in the fuel cell stack may be between 100° C.-1100° C., 250° C.-850° C., or 450° C.-650° C. In aspects of the invention, the fuel cell(s) may be metal supported SOFC.

BRIEF DESCRIPTION OF THE DRAWINGS

Embodiments of the invention will now be described, purely by way of example, with reference to the accompanying drawings, in which:

FIG. 1b shows a variation of the system shown in FIG. 1a;

DETAILED DESCRIPTION OF EMBODIMENTS OF THE INVENTION

Figure 1A:
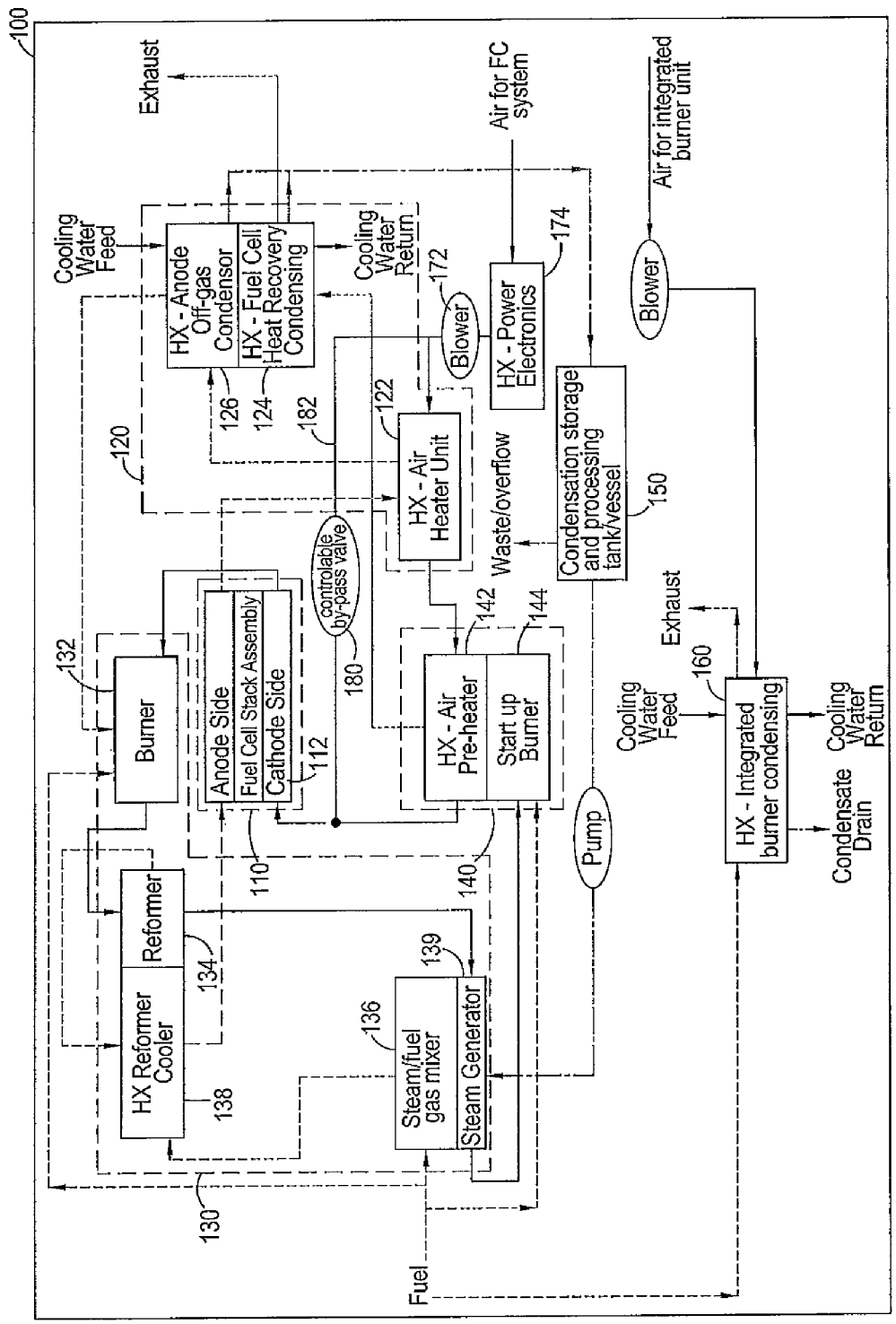
FIG. 1a shows a fuel cell system including a heat exchange system according to an embodiment of the invention.

FIG. 1a shows a fuel cell system 100 including a heat exchange system 120 according to an embodiment of the invention. The fuel cell system 100 includes a fuel cell stack assembly 110 and a heat exchange system 120. The fuel cell system 100 also includes a burner/reformer unit 130, a start-up heating unit 140, and a condensation water storage tank 150.

With reference to FIG. 1a, fluid flow paths undertaken by the oxygen gas (e.g. air) and the fuel gas for the operation of the fuel cell system are shown.

Firstly, the air-side feed system will be described. Oxygen containing gas, commonly air, is supplied to the fuel cell system 100 from the environment via an air filter unit (not shown) and a mechanical air movement device, in the present embodiment a variable speed air blower 172—with the blower speed being controlled by a system control unit (not shown). The air filter unit can be mounted on a frame surrounding the system. The air is drawn through the unit to the air blower 172 with minimal pressure losses. On its way through the blower 172, if the direction of air flow is controlled, the air can pick up heat from hot surfaces/heat exchangers that it comes in contact with, such as heat exchangers 174 mounted on the power electronics and transformer units.

This air then feeds from the air blower 174 to an air heater heat exchange unit 122 in the heat exchange system 120. The air heater heat exchange unit 122 is a gas/gas heat exchanger. One of the gas feeds is the incoming air fed from the air blower 172; the other is the anode off-gas coming from the fuel cell stack assembly (discussed in relation to the fuel side flow below). Under normal operation of the unit 122, a certain amount of heat energy is transferred from the anode off-gas feed from the fuel side of the fuel cell stack assembly (dropping the anode off-gas stream from the fuel cell stack outlet temperature, around 500-650° C., to above the boiling point temperature of water, around 100-200° C.) as it is fed across the heat exchanger 122 to heat the incoming air stream (heating the air stream from around ambient temperature, 0-50° C. to 100-250° C.). The difference in heating rates is due to the significantly higher flow rates of the air stream versus the anode-off gas. The degree of cooling provided to the anode off gas by the air heater heat exchange unit 122 can be controlled by the flow of air through the unit 122, which in turn is controlled by the speed of the blower 172.

The temperature of the air leaving the air heater heat exchanger unit 122 under normal operating conditions will have increased. However, the air temperature is further increased up to die temperature required for the fuel cell stack air inlet temperature. The inlet air temperature of the fuel cell stack is controllable. This can be achieved as described below.

The heated air leaving the air heater heat exchanger unit 122 then flows through an air pre-heater heat exchanger 142 in the air pre-heating unit 140. The air pre-heater heat exchanger 142 is used to boost the incoming air supply temperature to close to or at stack operating temperature by using heat energy contained in the post exhaust gas burner stream. In order to aid the control of the fuel cell stack inlet temperature, a controllable air by-pass valve 180, included in an air by-pass line 182, allows air to be supplied from a point before the air heater heat exchange unit to a point after the air pre-heater heat exchanger but before the fuel cell stack. The air by-pass variable control valve 180 in this by-pass line 182 allows for control of the air temperature by mixing the by-pass air with the air pre-heating heat exchanger outlet air ahead of the air entering the fuel cell stack by controlling the volume of air that by-passes. In an alternative embodiment, the air by-pass line and valve are omitted from the system.

The air pre-heating unit 140 of this embodiment includes a start-up burner 144, which, in the present embodiment, is supplied with fuel from the same source as the fuel cell system fuel supply (though in other embodiments it could be an electrical heater) and which is ignited to heat the air passing through the air pre-heater heat exchanger 142 in certain circumstances. In particular, it is operative during start-up of the fuel cell system 100, when the air heater unit heat exchanger 122 is not producing sufficient heat to heat die incoming air to the desired operating temperature. The start-up burner 144 may also operate during sudden changes in load, e.g. where the output required from the fuel cell stack assembly 110 is increased, requiring an increased operating temperature of the fuel cell stack assembly 110. The start-up burner and pre-heater may be a single unit.

The air supply then enters into the fuel cell stack assembly 110 on the air side (the cathode side), into the fuel cell cathode side active area 112. The now heated air stream flows to the fuel cell stack air side 112, crossing over the cathode areas of the fuel cell stack, undergoing oxygen depletion, and picking up heat from the cathode side 112 of the fuel cell active area and the surrounding environment and surfaces. At the end of the fuel cell cathode active area 112, the now partially oxygen depleted air stream is termed cathode off-gas with a temperature of around 500-650° C.

The cathode off-gas, once it has passed through the fuel cell stack assembly 110 does not immediately combine with the anode off-gas as in previous fuel cell systems, but instead the cathode off-gas exiting the fuel cell passes directly into a burner 132 in the burner/reformer unit 130.

The fuel feed side will now be described. In the present embodiment, the fuel is a hydrocarbon containing fuel, for example, either bottled gas (such as LPG) or piped gas, such as natural gas or town gas. Alternatively, other fuel feeds could be hydrogen (no fuel gas reformer would be required in this case) or sources such as coal gas, or carbon monoxide, or anaerobic digester gas, or bio-gas, or auto-gas, or gasoline or diesel or aviation fuels (kerosene or Jet-A1) or similar such fuels.

The fuel feed to the fuel cell system 100 is regulated to a set pressure and controllable flow rate (either by regulating from a main feed, or from at least one controllable pump, before passing through at least one isolation valve, through an optional and re-chargeable desulphuriser unit, and if required to a gas pressure boost pump with optional pulsation dampener). The main fuel gas feed temperature, for example a natural gas supply, will generally range from 0-50° C., more normally, from 12-25° C. By placing the desulphuriser unit before the pump, the desulphuriser unit is exposed to a lower pressure requirement and this has implications for its design, use of materials and also for maintenance/recharging of the desulphuriser material.

Several feeds can come off this fuel line depending on the system requirements. Firstly, as described above, a feed is provided to the start-up burner 144. This can be taken from either before or after the desulphurisation unit. This fuel feed is required to feed the start-up burner at system start-up or at times of rapid load change, from, say, a low power operating point to full power, as discussed above. The start-up burner 144 is, in the present embodiment, a sub-stoichiometric burner producing a hot exhaust stream to then feed the air pre-heater to heat the air flowing through the fuel cell stack and hence heat up the fuel cell stack assembly 110. The exhaust gas from the start-up burner 144 then flows to a fuel cell heat recovery/burner off-gas condenser heat exchanger 124 in the heat exchange system 120 (discussed in more detail below). At no point during start up or normal operation does the air pre-heater heat exchanger become a heat sink to the incoming heated air coming from the air heater heat exchange unit.

A further separate feed is provided after the desulphurisation unit and supplies the burner 132 of the burner reformer unit 130. This fuel feed is only used for system start up, where the burner 132 is run whilst the rapidly heating air is circulating through the fuel cell stack to heat up the fuel cell stack assembly 110 and related system components to near operating temperature. The burner 132 then reacts with the air and the depleted fuel reactants in the fuel cell stack exhaust stream and the resulting hot stream of gas (500-750° C.) enters a reformer 134 within the burner/reformer unit 130 to heat up the reformer 134 to close to operating temperature. In the present embodiment, desulphurised fuel is used as a feed to the burner 132 as it simplifies the burner catalyst design. Further, the use of a pump overcomes back-pressure issues that might arise as a result of pressure drops in the flow path downstream of the burner 132. However, if a sulphur tolerant burner is used, then desulphurised fuel is not a specific requirement.

In the embodiment shown in FIG. 1a, the remaining fuel is fed, via an optional non-return valve (not shown), to a steam/fuel gas mixer 136 and steam generator 139, where it mixes with steam. The temperature of the steam fed fuel is raised to 120-400° C., before it enters a reformer heat exchanger 138, in which the fuel stream picks up temperature from a reformate stream passing from the reformer 134 (discussed below), raising the fuel stream temperature to 350-550° C. before it passes into the fuel reformer 134. The endothermic reaction of a catalyst provided in the reformer 134 for the reformation process has heat fed from the burner 132 output that passes through the reformer 134. The now reformed fuel (reformate) exits the reformer 134 at between 500-750° C. before it passes back through the other side of the reformer heat exchanger 138 to transfer some of its heat to heat the incoming fuel gas. The reformer heat exchanger 138 and the fuel reformer 134 may be a single unit. Further, the burner 132 may be in the same unit as the reformer 134 and reformer heat exchanger 138.

Figure 1B:
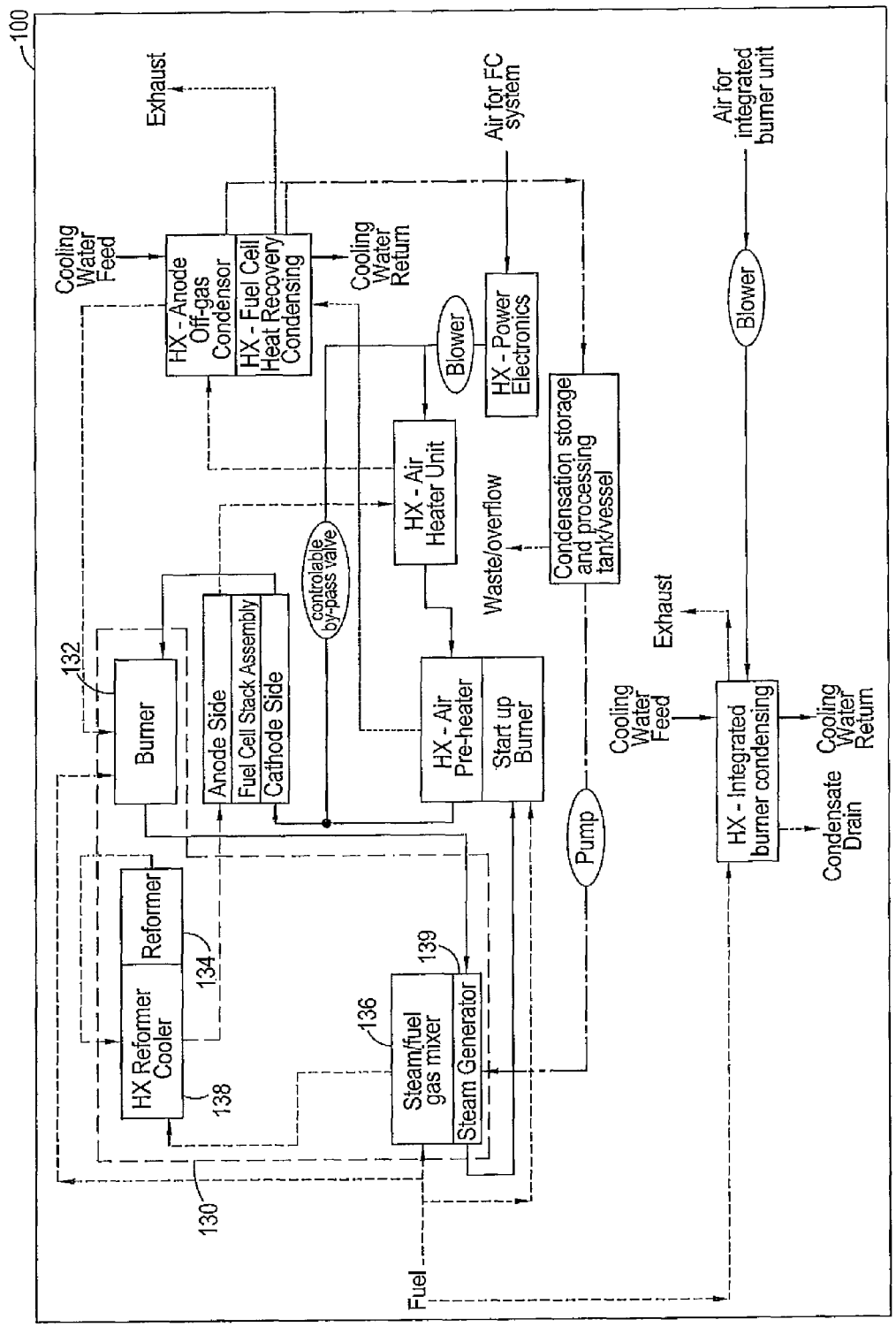

In another embodiment, shown in FIG. 1b, and which is otherwise the same as that described with reference to FIG. 1a, the remaining fuel is fed, via an optional non-return valve (not shown), to a steam/fuel gas mixer 136, where it mixes with steam, as in the first embodiment. The temperature of the steam fed fuel is raised to 120-400° C. in the embodiment shown in FIG. 1b, before it enters the reformer heat exchanger 138, in which the fuel stream picks up temperature from the reformate stream passing from the reformer 134, raising the fuel stream temperature to 350-650° C. before it passes into the fuel reformer 134. In the embodiment shown in FIG. 1b, the reaction is exothermic, rather than endothermic, by reaction of a catalyst provided in the reformer 134. In the embodiment shown in FIG. 1b, the reformation process is self-sustaining. Therefore, in this embodiment, heat from the burner off-gas is not required, and the burner off-gas does not feed through the reformer 134. The now reformed fuel (reformate) exits the reformer 134 at between 500-750° C. before it passes back through the other side of the reformer heat exchanger 138 to transfer some of its heat to heat the incoming fuel gas. The reformer heat exchanger 138 and the fuel reformer 134 may be a single unit. Further, the burner 132 may not be in the same unit as the reformer 134 and reformer heat exchanger 138. The burner off-gas stream may feed from the burner 132 to the steam/fuel gas mixer 136.

Returning now to FIG. 1a, the reformate gas leaves the reformer heat exchanger 138 at around 350-550° C. before it enters the fuel cell stack assembly 110 on the fuel side 114. The reformate passes through the anode side fuel cell active area 114, passing over the anode sides of the fuel cells in the fuel cell stack, undergoing exothermic electrochemical reactions to pick up oxygen ions that have come across the fuel cell assembly from the air on the cathode side, produce electricity and release heat. These oxygen ions combine with the hydrogen in the reformate stream to produce steam, so closing the electrochemical reaction and driving the electrons around the electrical load circuit from one side of the fuel cell stack to the other via the power electronics system and electrical loads. The electrical loads can both be internal to the fuel cell system and external to the fuel cell system.

The reformate stream is converted to a less hydrogen rich stream as it travels across the anode side fuel cell active area 114. As it leaves the anode side fuel cell active area 114 it is termed anode off-gas. The anode off gas takes with it steam from the fuel cell area, and also picks up heat from the anode side fuel cell active area 114 and its surrounding environment and surfaces.

The anode off-gas leaves the fuel cell stack assembly 110 at 500-620° C. This anode off-gas stream then passes into the gas-gas air heater heat exchange unit 122 to give up some of its heat energy to the incoming air stream, which heat energy is then returned to the fuel cell stack assembly 110 via the air side gas feed. The anode off-gas leaves the air heater heat exchanger unit 122 at around 100-300° C. This stream then passes into all anode off-gas condenser heat exchanger 126, where the temperature is reduced to as low a temperature as reasonably possible (0-100° C., but preferable to be in the region of 20-60° C.) given the environmental temperature and the cooling capacity of the heat exchanger heat transfer fluid. At such temperatures, anode off-gas steam condensing can occur in order to recover the water contained within the anode off-gas stream and hence recover the associated latent heat of evaporation energy. This anode off-gas condenser heat exchanger 126 is a gas-to-liquid heat exchanger with a preference for a high thermal energy storage medium being used on the opposing side of the heat exchanger to the anode off-gas as the heat transfer fluid. Such a medium could be, say, water from a thermal store, or a water mix from a cooling radiator in a car, or a refrigerant fluid, or an oil or other fuel fluid. The medium could also be air. The anode off-gas condenser heat exchanger 126 is arranged such that the condensate can collect and drain from the heat exchanger 126, via baffles if required when mounted for an application where movement is uncertain. The heat exchanger 126 is discussed in more detail below.

The anode off-gas then flows from the condenser heat exchanger 126 to the burner 132, where it is combined with the cathode off-gas and burnt over a suitable catalyst or in the presence of a flame. The cooling of the anode off gas allows the burner 132 to operate at a lower temperature, which reduces the cost of the burner.

The burner reaction consumes, and thus removes, any unused fuel from the anode off-gas stream and produces a hot gas stream of around 600-850° C., called the burner off-gas stream, which is a continuation of the cathode off gas stream.

The burner off-gas stream then feeds directly to the reformer 134 in the embodiment shown in FIG. 1*a*, to thermally balance the fuel feed endothermic reformer reaction via the reformer heat exchanger 134 to heat up the reformer 134. The burner off-gas stream leaves the reformer at 580-720° C. The burner 132 and reformer 134 may be part of the same unit.

As discussed above, in the embodiment shown in FIG. 1*b*, the burner off-gas does not pass through the reformer 134. In both embodiments shown in FIGS. 1*a* and 1*b*, the burner off-gas stream then feeds to at least one steam generator 139, where the heat energy is partially transferred via a heat exchange surface to water to generate steam that feeds into the fuel stream that supplies the reformer 134. The water for the steam generator is stored in the condensation water storage tank 150. The burner off-gas leaves the steam generator 139 at between 400-650° C., depending on the operating conditions of the system. The steam generator 139 and steam/fuel gas mixer 136 may be combined in a single unit. The burner 132 and/or the reformer 134 may also be provided in the same single unit.

The burner off-gas then passes through the start-up burner 144 and across the air pre-heater heat exchange unit 142 (which, as discussed above, is a gas to gas heat exchanger) where some of the heat energy transfers across the heat exchanger 142 to heat the incoming air stream. In the present embodiment, this heating action reduces the burner off-gas temperature to 100-350° C. in steady state mode.

The cooled burner off-gas stream then passes to the fuel cell heat recovery condenser heat exchanger 124, where the temperature is dropped to as low a temperature as reasonably possible (0-80° C., but preferably in the region of 15-50° C.) given the environmental temperature and the cooling capacity of the heat exchanger heat transfer fluid. At these temperatures, burner off-gas steam condensing can occur in order to recover the water contained within the burner off-gas stream and hence recover the associated latent heat of evaporation energy. Thus, the cathode off-gas passes through the burner 132, reformer 134, steam generator 139 and air preheating unit 140 before entering the fuel cell heat recovery condenser heat exchanger 124, but after the burner unit the cathode off-gas has combined with the anode off-gas and been burned in the burner unit, so is termed burner off-gas.

The fuel cell heat recovery condenser heat exchanger 124 may be a gas to liquid heat exchanger, with a high thermal energy storage medium being on the opposing side of the heat exchanger to the burner off-gas. Such a medium is, in the present embodiment, water from a thermal store, but could alternatively be from a cooling radiator in a car or a ground source heat pump system. The heat exchanger 124 is arranged such that the condensate can collect and drain from the heat exchanger, via baffles if required when mounted for an application where movement is uncertain. The heat exchanger 124 is described in more detail below.

The heat transfer fluid that feeds the fuel cell heat recovery condenser heat exchanger 124 can also be the same as that that flows via the anode off-gas condenser heat exchanger 126. Thus the anode off-gas condenser heat exchanger 126 and the fuel cell heat recovery condenser heat exchanger 124 can be the same unit with a common cooling side feed. In the present embodiment, the arrangement is that the heat transfer fluid will cool, the anode off-gas first in order to recover the maximum amount of latent heat, and hence condensate, from the anode off-gas. Such an arrangement is discussed in more detail below. In the present embodiment, the heat transfer fluid is liquid water, although other heat transfer fluids, such as oil, liquid or gaseous refrigerants, liquid or gaseous fuels, or air or the like could also be used.

In an alternative embodiment, the heat transfer fluid flowing through the heat exchangers 124, 126 is divided and flows via each heat exchanger 124, 126 and the flow volumes to each heat exchanger 124, 126 are controlled, for instance passively or via a simple choke arrangement, to optimise the heat removal from each heat exchanger cooling side. The heated heat transfer fluid is then fed to the thermal store, or to the thermal load, or to the thermal transfer unit or to the heat rejection device. The condenser heat exchangers may be cooled by using cool air flow, especially where the fuel cell system is not a CHP (combined heat and power) system or tri-generation system, such as that provided by a fan arrangement, or by a cold surface such as an area a ship that is below the water line—such as for instance an area of the hull, or rudder, or flap, or a satellite surface or an aircraft surface.

The condensate from the condenser heat exchangers 124, 126 is collected and fed to the condensate collection tank 150 where it can be filtered, degassed, conditioned and stored in the condensation water storage tank 150 ready for use as water for the steam generator 139 of the burner/reformer unit 130.

By reclaiming water from off-gas(es) exiting the fuel cells, the water can be reused in the reforming process. This reduces, and can eliminate in some embodiments, the need for a separate supply of water to the fuel cell system as a whole. Because of this, significantly less processing is required for water used in die system, which results in smaller processing (e.g. softening) unit requirements, and overall size of the system. Heat energy remaining in the recovered water can also be used to ensure that the water system temperature as a whole remains above the freezing temperature of water.

The burner off-gas stream leaves the heat exchanger system 120 and passes though an optional non-return valve (not shown) before exiting the unit to via an exhaust flue assembly to atmosphere or another extraction system.

In the present embodiment, an additional integrated condenser heat exchanger and burner assembly 160 is incorporated in the system. Such a unit is similar to an integrated condenser heat exchanger and burner assembly found in domestic condensing boiler units. This unit has a separate fuel feed. The integrated condenser heat exchanger and burner assembly 160 can run independently of the fuel cell system 100 but is contained within the same system envelope, being controlled by the control electronics that are common to both the fuel cell system 100 and the integrated condenser heat exchanger and burner assembly 160. The fuel feed does not necessarily require desulphurisation if sulphur compounds are present in the fuel gas. Such an additional heat exchanger allows for additional thermal energy to be provided to the thermal store or heat load, and for additional condensing to occur if required either for additional energy recovery or for the provision of condensed water. Independent but linked integrated burner and condenser heat exchanger unit that affords additional heat output independent of the fuel cell. This independent additional heat exchanger can also supply additional condensing water if the condensing system includes a suitable contaminant removal set-up to remove any sulphur or nitrous or similar related contaminants.

The integrated condenser heat exchanger and burner assembly 160 has its own pump or blower fed air supply. The air is supplied to the integrated condenser heat exchanger and burner assembly 160 from the environment via an optional air filter unit (not shown) and a controllable air blower. The filter can be mounted on the frame surrounding the system. The air is drawn through the unit to the air blower with minimal pressure losses. On its way through the unit, if the direction of air flow is controlled, the air can pick up heat from hot surfaces/heat exchangers that it comes in contact with. In addition, the integrated condenser heat exchanger and burner assembly 160 has its own circulation pump that circulates the heat transfer fluid from the thermal load or thermal store. This may be the same as the heat transfer fluid used in the anode off-gas condenser heat exchanger 126 and fuel cell heat recovery heat exchanger 124. The load can be a thermal store or a heat radiator assembly such as an radiator for automotive applications, a radiator for shipping container heating or cooling, or a radiator for a space heating system such as that found in typical domestic or office situations.

In this way the integrated condenser heat exchanger and burner assembly 160 can operate independently from the fuel cell system 100 and yet still meet thermal demands from the source or load.

The electricity produced by the fuel cell stack assembly 110 is fed via the power electronics unit to the electrical load or loads. Some of this power can be taken to feed the fuel cell system power requirements either directly or by feeding power onto the load grid and taking power back off the load grid.

Figure 1C:
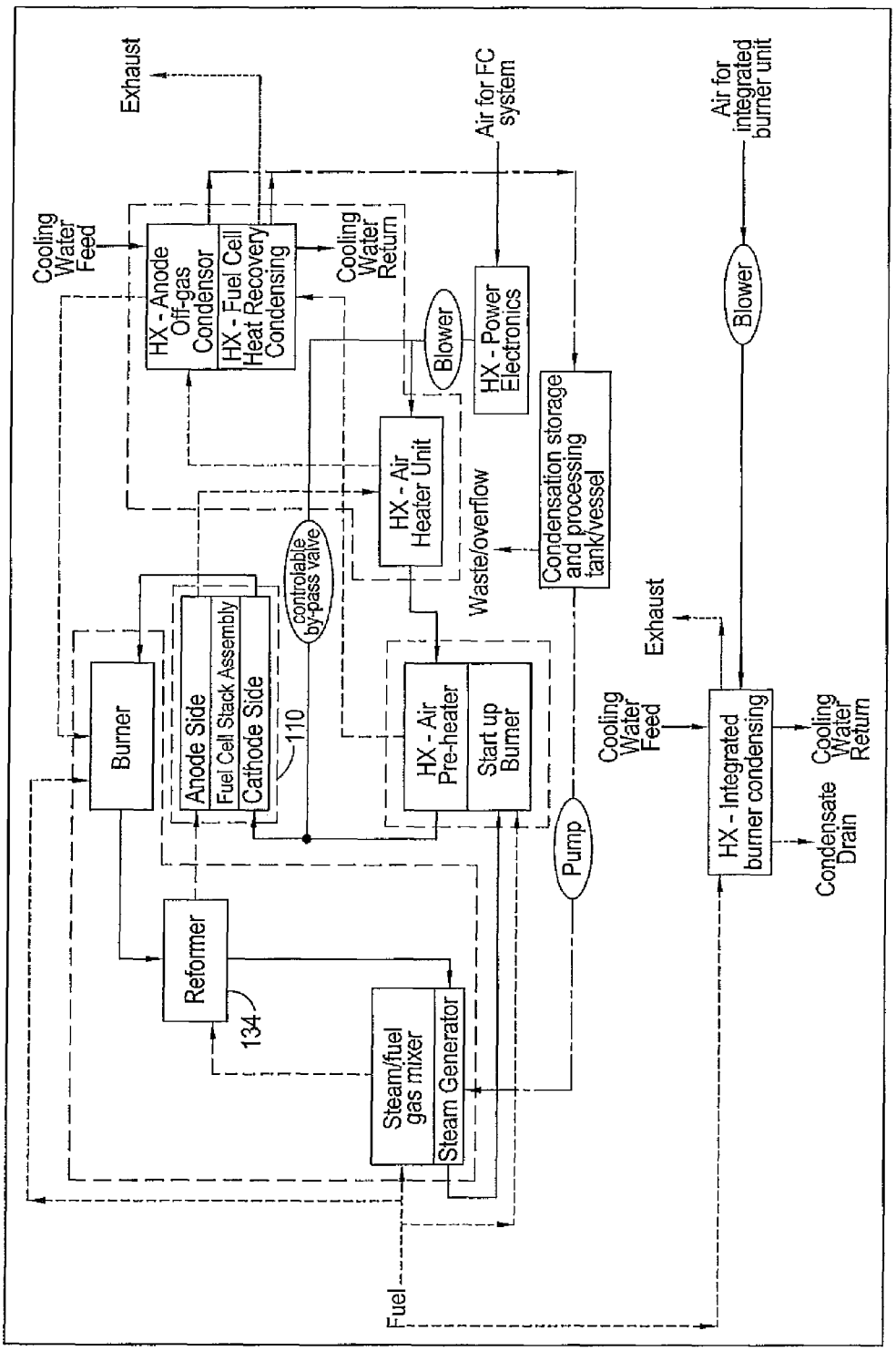
FIG. 1c shows a variation of the system shown in FIG. 1a, with an alternative reformate flow path to the fuel cell stack assembly omitting the reformer cooler heat exchanger unit.

An alternative reformate feed to FIG. 1a is shown in FIG. 1c. Here the reformer heat exchanger 138 is removed and thus by doing so the output of the reformer is not cooled by the reformer heat exchanger, but flows via at least one fluid conduit to the fuel cell stack assembly 110. The fluid conduit may be so designed to allow sufficient reformer output temperature reduction such that the reformate entering the fuel cell stack assembly is of the right temperature, and is below that at which it leaves the reformer 134. With such an alteration, the design of reformer unit 134 may be altered to allow for the loss heat energy from the missing reformer heat exchanger 138. The system design alteration in FIG. 1c is applicable to all of the system layouts here disclosed.

Figure 2A:
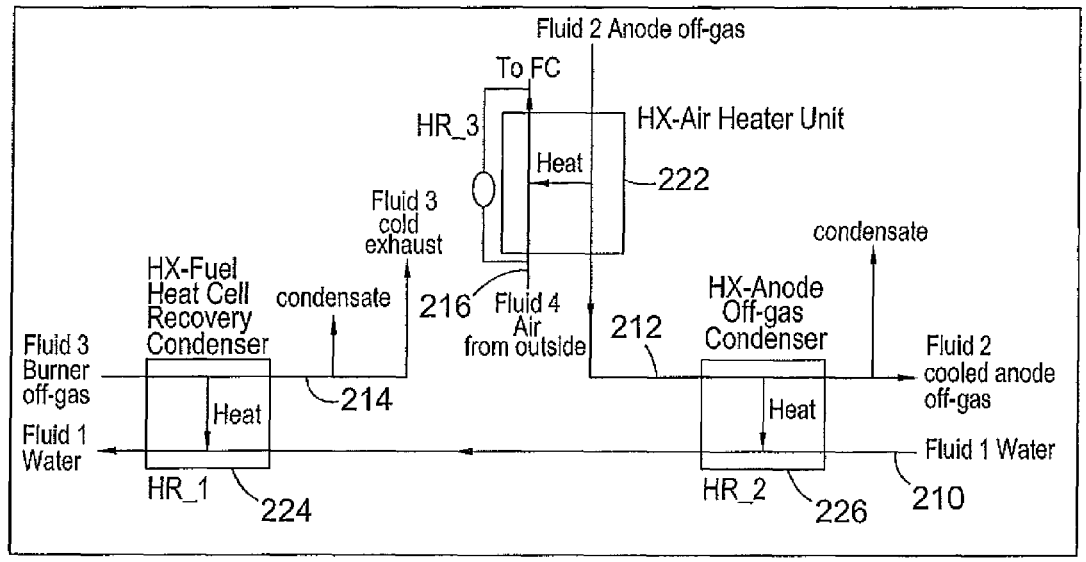
FIG. 2a shows a heat exchange system according to an embodiment of the invention, for use in the fuel cell system shown in FIG. 1a or 1b.

A simplified diagram showing a heat exchange system for use in the fuel cell system of FIG. 1a, having separated anode and cathode/burner off-gases is shown in FIG. 2a. Three heat exchangers are shown. These are a first heat exchange element 226 which may be, for example, the anode off-gas condenser heat exchanger 126 of FIG. 1a, a second heat exchange element 224 which may be, for example, the fuel cell heat recovery/burner off-gas condenser heat exchanger 124 of FIG. 1a and a further heat exchange element 222 which may be, for example, the air heater heat exchanger 122 of FIG. 1a. Further, four fluid paths are shown. These are 1. a first fluid path 210 of heat transfer fluid through the first heat exchange element 226 and subsequently through the second heat exchange element 224, 2. a second fluid path 212 through the further heat exchange element 222 and subsequently through the first heat exchange element 226; 3. a third fluid path 214 through the second heat exchange element 224; and 4. a fourth fluid path 216 through the further heat exchange element 222.

The first fluid flow path 210 comes to the first heat exchange element 226 from a cold side of a thermal store or heat rejection device or unit, and exits the second heat exchange element 224 to a warm side of a thermal store or radiator heat rejection device or unit. The first fluid is water in the present embodiment. The thermal store might be a domestic water heating store, and or might be a domestic heating system. Various other options are described herein and further options will also be apparent to one skilled in the art.

The second fluid flow path 212 comes to the further heat exchange element 222 from an anode side active area of a fuel cell system, and subsequently exits the first heat exchange element 226 to a burner of a fuel cell system, for example as shown in FIG. 1a. The second fluid is anode off-gas from the fuel cell.

The third fluid flow path 214 contains burner off-gas and comes from a pre-heater burner to the second heat exchange element 224, and exits as exhaust. The fourth fluid flow path 216 is air, which is passed through the further heat exchange element 224 and is then output to be used in the air side flow of the fuel cell. The capacity of heat exchange for each element can be varied by sizing as appropriate, and by varying the relative flow rates of the two fluids and/or the entry temperature of the heat transfer fluid to the first heat exchanger. An example of such control could include, for instance, a variable speed heat transfer fluid pump and/or a variable thermal output control device (such as a radiator and fan unit in a car) through which the heat transfer fluid flows prior to entering the first heat exchanger unit). Further, the overall heat exchange of the two units 224, 226 can be varied by changing the flow rate of the heat transfer fluid.

In operation, hot anode off-gas flows from the fuel cell along the second fluid path 212 through the further heat exchange element 222. Heat is exchanged from the anode off-gas to the air drawn in to the system along the fourth fluid path 216. Heat is passed from the anode off-gas to the air in the further heat exchange element 222, cooling the anode off-gas and warming the air before it enters the fuel cell assembly. The further heat exchange element 222 is a gas-gas heat exchanger. The anode off-gas then continues along the second fluid path 212 to the first heat exchange element 226, which receives heat transfer fluid in the form of water along the first fluid flow path 210. The anode off gas is further cooled by the first heat exchange element 226, which is a condenser heat exchanger, and so removes latent heat of fusion energy from the anode off-gas. The heat transfer fluid is warmed in this heat exchange.

The heat transfer fluid then passes along the first fluid path 210 to the second heat exchange element 224 and receives heat energy from the burner off gas in the third fluid flow path 214. The second heat exchange element 224 is also a condenser heat exchanger, and so removes latent heat of fusion energy from the burner off-gas. The heat transfer fluid is further warmed in this heat exchange process.

In an embodiment, the first and second heat exchange elements 226, 224 are combined into a single unit. In a further embodiment, the further heat exchange unit 222 is also incorporated into the single unit. In a further embodiment, the first and further heat exchange units 226 and 222 are incorporated into a single unit.

Figure 2B:
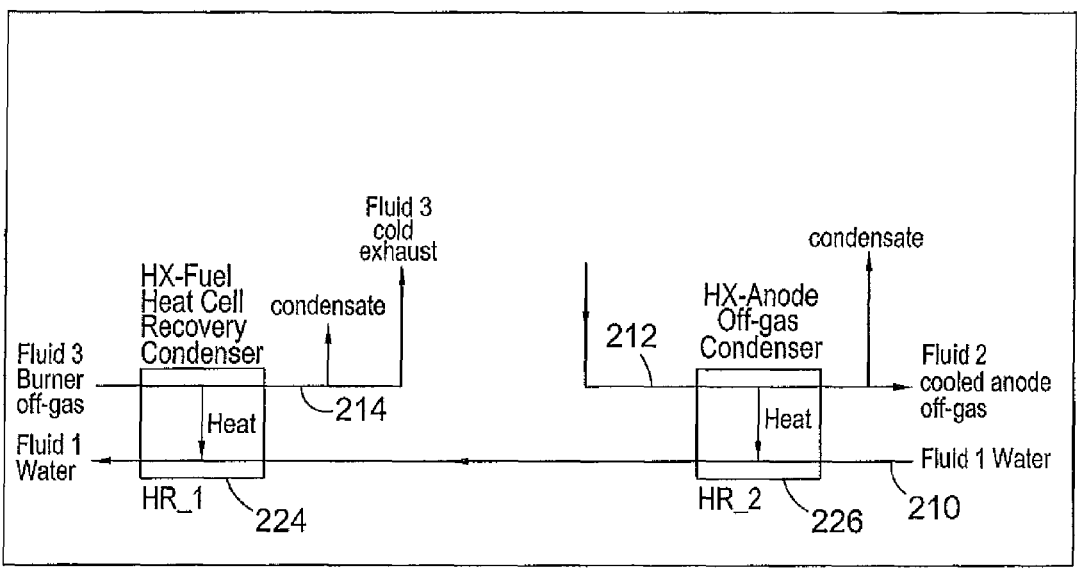
FIG. 2b shows an alternative heat exchange system according to an embodiment of the invention.

In an alternative embodiment, shown in FIG. 2b, the further heat exchange element and the fourth fluid flow path of FIG. 2a are omitted, the second fluid flow path being through the first heat exchange element only.

Figure 2C:
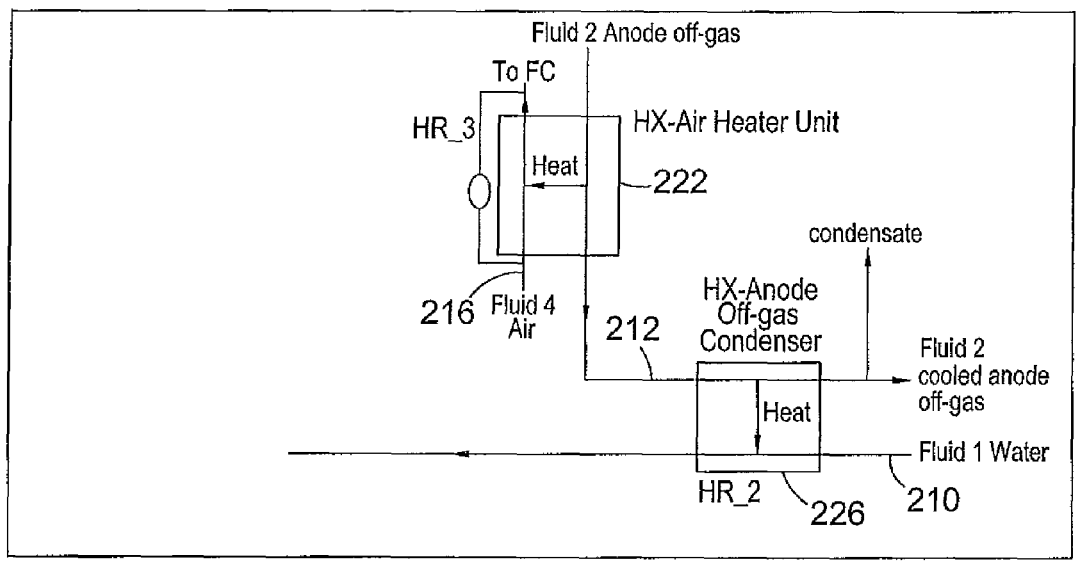
FIG. 2c shows another alternative heat exchange system according to an embodiment of the invention.

In a further alternative embodiment, shown in FIG. 2c, the second heat exchange element of FIG. 2a is omitted, and the first fluid flow path is through the first heat exchange element only.

Figure 2D:
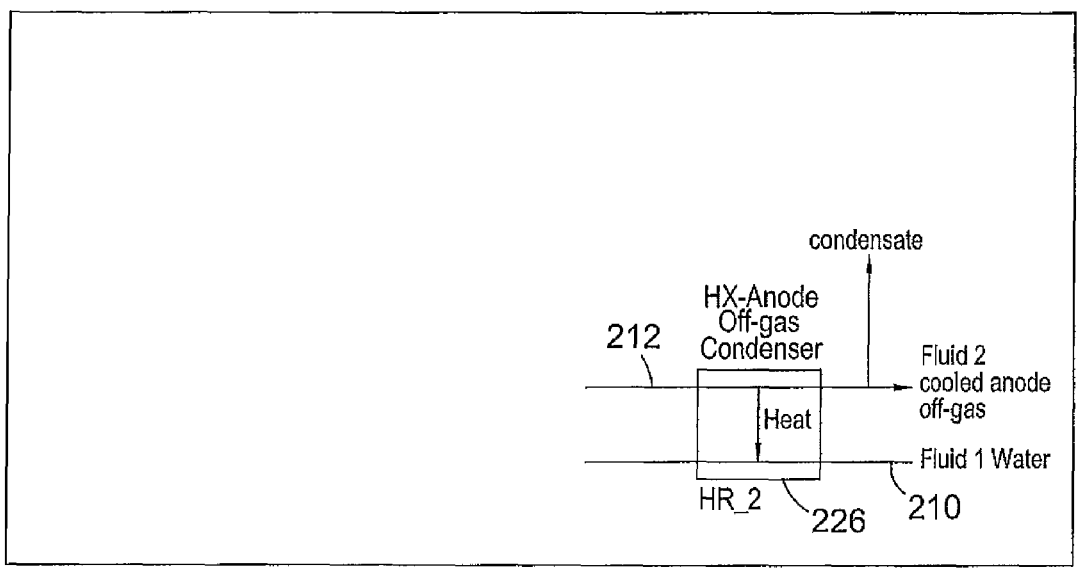
FIG. 2d shows another alternative heat exchange system according to an embodiment of the invention.

In a further alternative embodiment, shown in FIG. 2d, both the second and further heat exchange elements of FIG. 2a are both omitted. In this embodiment, the second fluid flow path is from the fuel cell stack, and through the first heat exchange element.

In each of FIGS. 2, 2b, 2c, and 2d, the references to condensate may be omitted if no condensate is generated by the heat exchange elements.

Figure 3:
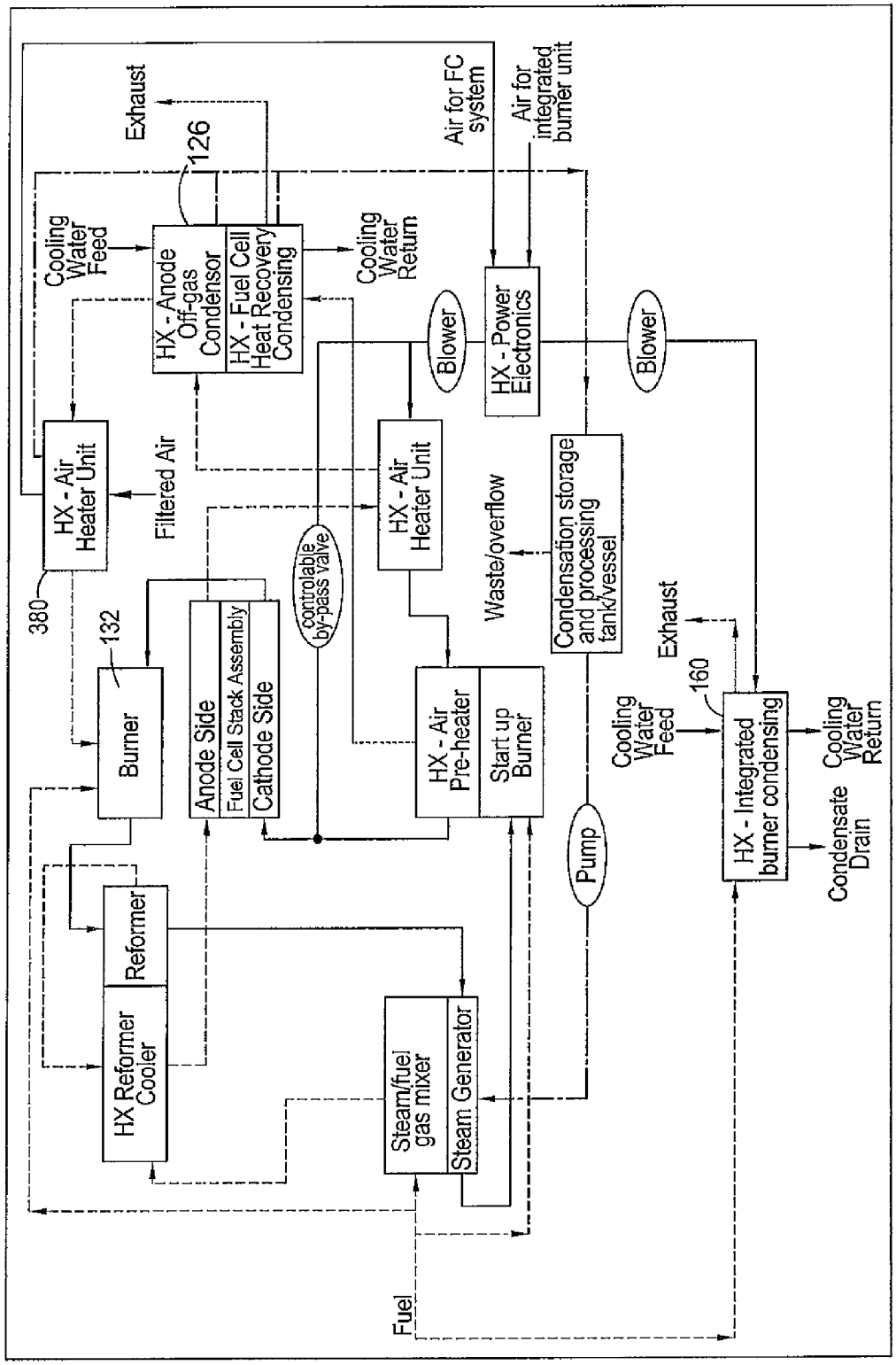
FIG. 3 shows an alternative fuel cell system including a heat exchange system according to an embodiment of the invention.

A further embodiment will now be described with reference to FIG. 3. In this embodiment, which, referring to FIG. 1a, has like elements being referred to with like references, an additional gas-gas heat exchanger unit 380 is inserted between the anode off-gas heat exchanger 126 and the burner 132. This additional gas-gas heat exchanger 380 uses air that is being pulled into the cathode air feed to the fuel cell system upstream of any heat being added to the air stream, i.e. before the power electronics heat exchanger 174, as shown. The additional cooling offered by the air flow affords additional condensing to occur from the anode off-gas before it is returned to the burner 132 and as such may raise the overall operating efficiency of the system. In an alternative, air that is being blown into the integrated burner condenser 160, may be used as the cooling, intake for the additional heat exchanger 380. Further, in this embodiment, the flow of the air for the integrated burner unit 160 is passed through the power electronics heat exchanger 174, although this may be omitted.

Figure 4:
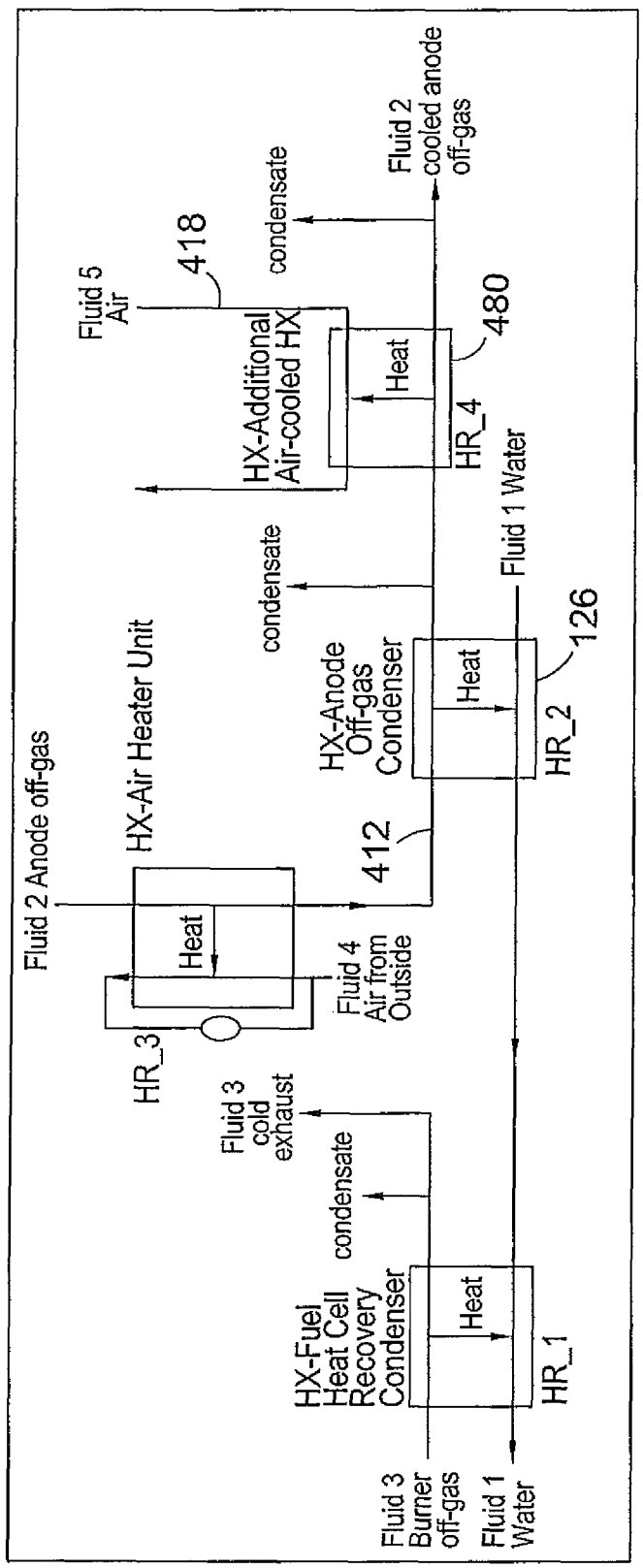
FIG. 4 shows a heat exchange system for use in the fuel cell system of FIG. 3.

A heat exchange system embodying the invention and containing such an additional heat exchange element is shown in FIG. 4. FIG. 4 corresponds to FIG. 2a, with the exception that the additional heat exchange element 480 is provided in a slightly modified second fluid flow path 412, after the first heat exchange element 126, and a fifth fluid flow path 418 is provided, through the additional heat exchange element 480. This results in more condensate, and hence more heat, being removed from the anode off-gas flowing through the second fluid flow path 412.

In a further embodiment, the pipe carrying the anode off-gas from the anode off-gas condenser heat exchanger to the burner runs on the outside surface of the system assembly, exposing the pipe to ambient environmental temperatures such as the surrounding air, or forced air flow or even water if, for example the pipe became part of a hull of a ship or similar aspect that is below the water line.

Figure 5:
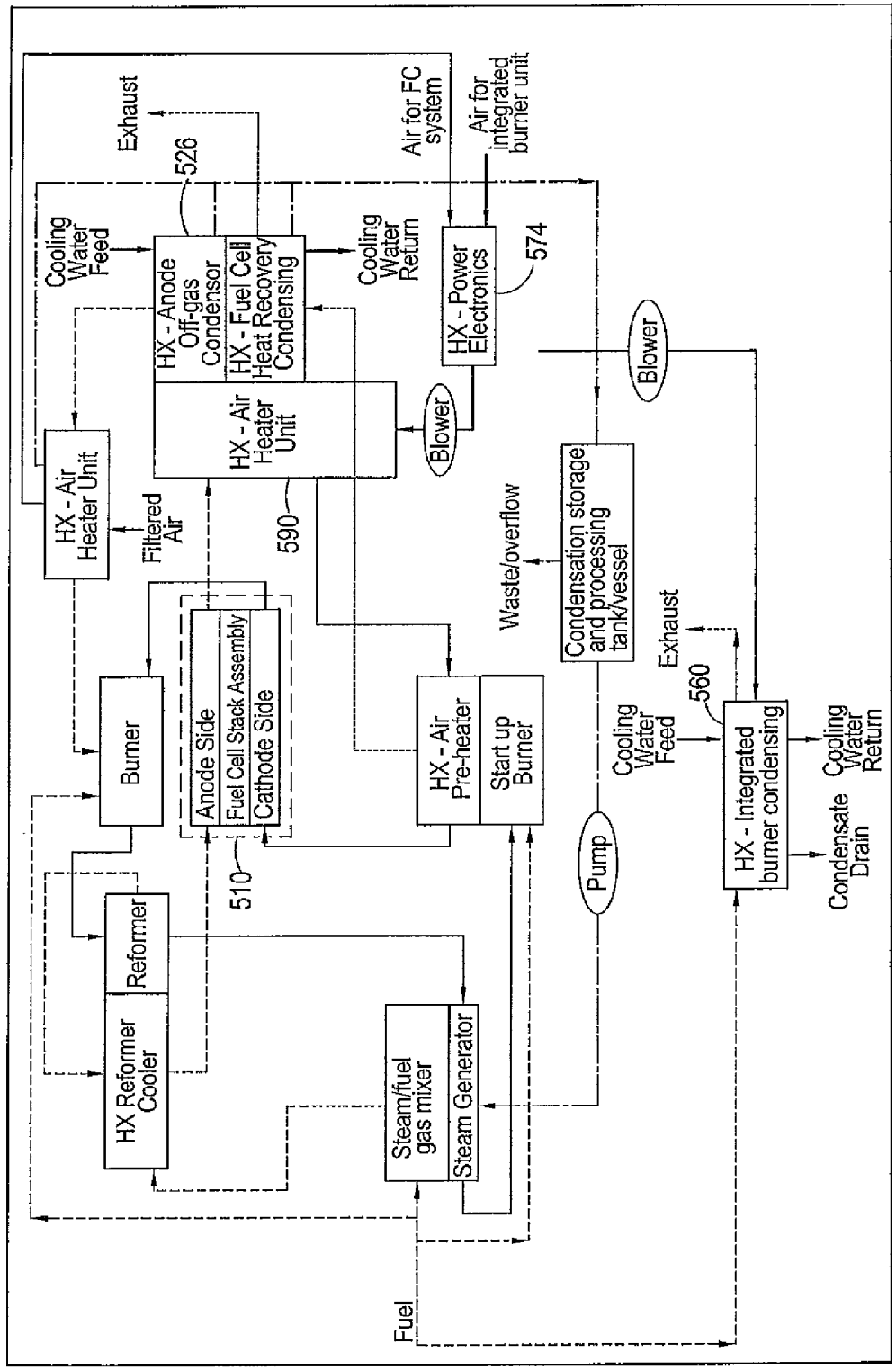
FIG. 5 shows an alternative fuel cell system including a heat exchange system according to an embodiment of the invention.

Another embodiment of this additional gas-to-gas heat exchanger 380 is shown in FIG. 5; elements corresponding to those described with reference to FIG. 1a, have corresponding reference numerals (the initial "1" being replaced with a "5"). In this embodiment, the power electronics heat exchanger 574 is cooled by air for the integrated condenser burner 560 and/or for the fuel cell assembly 510. The flow of air can also go through a further additional air cooled heat exchanger 590 to provide additional cooling and hence provide an additional condensing effect.

Figure 6:
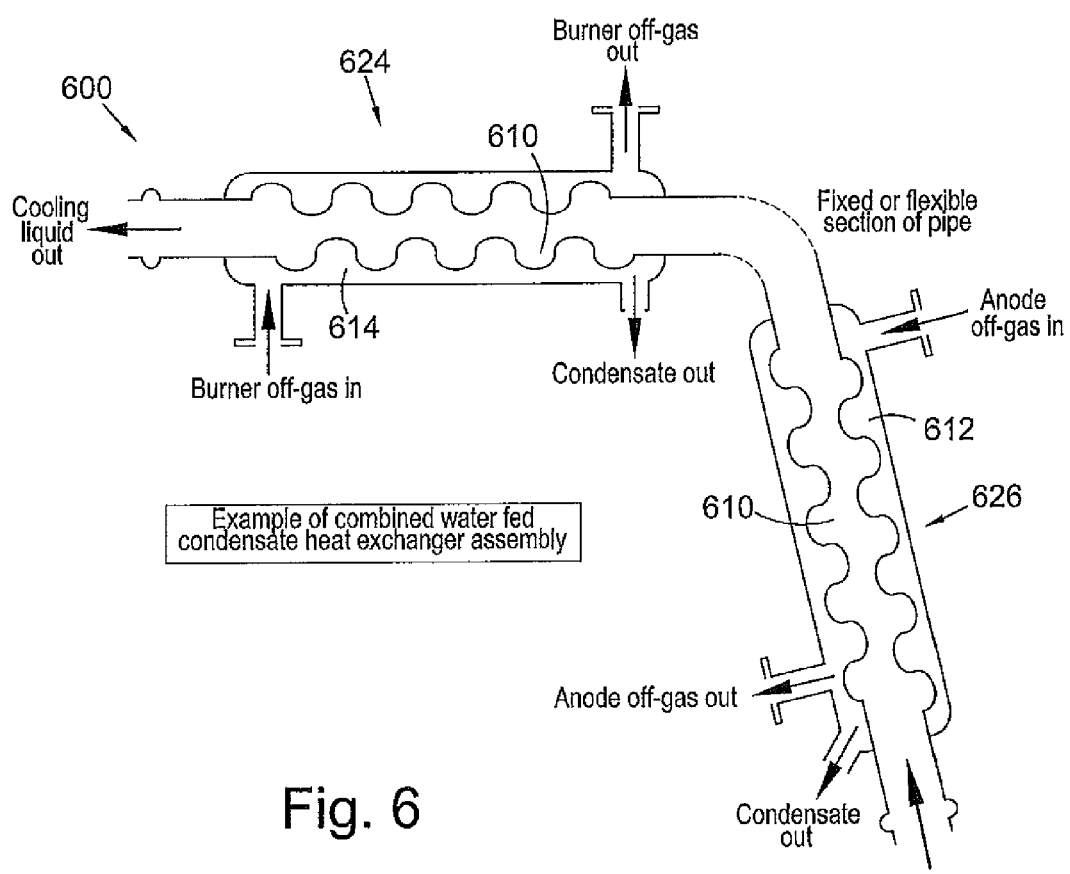
FIG. 6 shows combined first and second heat exchange elements according to an embodiment of the invention.

FIG. 6 shows a combined heat exchange system 600 with first and second, or anode off-gas and fuel cell heat recovery condenser heat exchange elements 624, 626 according to an embodiment of the invention, which may be as shown in a previous embodiment. In this embodiment, a common tube 610 defines a first, heat transfer, fluid flow path, which carries the heat transfer fluid. This tube diameter and thickness can be continuous or varied or have heat exchange feature added to enhance or control heat exchange, such as fins or turbulence enhancing features, to match thermal exchange requirements of the combined heat exchanger unit based on the application specification and the temperatures of the heat exchanger fluid flows. The first heat exchange element 626 further includes a second fluid flow path, for anode off gas, 612, which carries anode off gas past the tube 610, to allow heat exchange from the anode off gas to the heat transfer fluid. The second heat exchange element further includes a third fluid flow path 614 for receiving burner off gas and allowing heat exchange from that gas to the heat transfer fluid.

In use, heat transfer fluid, for example in the form of water or treated water, a refrigerant fluid, or an oil, or other fuel fluid or air, flows through the tube 610 from the first element 626 and then to and through the second element 624. As the heat transfer fluid flows through the first element 626, it absorbs heat energy from the anode off-gas in the second fluid flow path 612. The anode off gas is sufficiently cooled that steam in the gas flow condenses out and runs out of the first element 626, in the present embodiment, simply by gravity flow or via a scavenge pump. As the heat transfer fluid flows through the second element 624, it absorbs heat energy from the burner off-gas in the third fluid flow path 614. The burner off gas is also sufficiently cooled that steam in the gas flow condenses out and runs out of the second element 624, in the present embodiment, also by gravity flow. Alternatively, if backflow is an issue and is to be avoided, the condensate may be drained under very slight pressure via a low pressure set one-way valve. The gases exit the first and second element 626, 624, having been cooled by the heat transfer fluid, and the heat transfer fluid exits having been warmed by both gases.

The two air receiving regions 612, 614 of the heat exchangers can be joined, for example by welding or brazing or other such material joining technique, to this tube 610 using simple covering units with simple feed in and out connections. Such a type of assembly may be advantageous in that it is very simple to construct as it has few components, and can be mass manufactured, for instance by using hydro-forming processes, can be made from low-cost steels, can be readily sized for differing applications and thermal requirements and is flexible in packaging location and volume, having a simple, flexible bend inserted in the centre portion. Other examples of suitable heat exchangers are a stamped, machined or etched plate heat exchanger, shell and tube heat exchanger and multi-stream heat transfer devices.

In embodiments described above, heat may be provided into the fuel cell system by reversing the heat exchange direction across one or more of the heat exchange elements discussed above. This approach may be used, for example for fuel cell system start-up from cold, frost protection, condensation avoidance or low temperature protection of the fuel cell system. This may be achieved in a number of ways, for example, with reference to FIG. 1a, by reversing the direction of the blower 172 and taking in air via the exhaust outlet and across the heat exchange element 124 which is receiving heat transfer fluid from a thermal store or radiator at a higher temperature than the air entering the exhaust. Thus the incoming air is heated and passed in reverse through the system at such a rate as to prevent freezing or condensation occurring within the fuel cell system. Such an embodiment, might be used for example in an automotive APU application, where the heat transfer fluid can pick up heat from the hot automotive exhaust or the hot side of the engine cooling circuit. In addition, the air entering via the fuel cell system exhaust may be taken from across the engine exhaust or even from the engine exhaust stream itself. Such operations might occur continuously whilst the fuel cell is not in full operating mode, or be on a timer cycle, or be triggered by certain monitored conditions. Such monitored conditions could include when the fuel cell system temperature drops below a certain temperature (which might be 3 or 5° C. for frost protection), or could be a measurement of humidity and temperature difference between the fuel cell system and the temperature of the environment (for condensation protection, for example).

In another such reverse heating embodiment, again with reference to FIG. 1a, electrical power is available to the fuel cell system when the fuel cell system is not operational. Examples include being connected to the grid or a battery device. Even though the fuel cell system is not operating, the power electronics unit 174 may be powered from the connected electrical power source to produce sufficient heat energy to heat the incoming air and then exchange some of this heat across the air heater heat exchanger 122 to heat the fuel gas stream. In another embodiment, the heat thus generated by the power electronics is used to heat the air circulated through the fuel cell system by the blower unit 172 to prevent condensation or freezing of the fuel cell system when the system is not in operation.

In a further embodiment of the invention, either or both of the first and second heat exchange elements are adapted to receive more than one heat transfer fluid. In an embodiment, the design of such a heat transfer exchange element allows through passage of the heat transfer fluid with at least two heat exchange zones designed such that each heat exchange zone has a controllable rate of heat exchange fluid flowing through it. In another embodiment, the first fluid flows through the heat transfer exchange element and the element is arranged so that the heat exchange fluids each controllably pass through separate enclosures in the heat exchange element so that they do not mix. In embodiments the flow of the different heat exchange fluids is controllable, to controllably remove heat at different rates.

The present invention has been described purely by way of example, and various modifications, additions and/or omissions will present themselves to one skilled in the art, all of which form part of the invention, together with their equivalents.

Unless the context clearly indicates otherwise, the words "comprise", "comprises", "comprising" and the like are to be interpreted in an inclusive, rather than exhaustive sense i.e. the sense of "including, but not limited to".

100 fuel cell system
110 fuel cell stack assembly
120 heat exchange system
122 air heater heat exchange unit
124 fuel cell heat recovery/burner off gas condenser heat exchanger
126 anode off gas condenser heat exchanger
130 burner/reformer unit
132 burner
134 reformer
136 steam/fuel gas mixer
138 reformer heat exchanger
139 steam generator
140 air pre-heating unit
142 air pre-heater heat exchanger
144 start-up burner
150 condensation water storage tank
160 integrated condenser heat exchanger and burner assembly
172 air blower
174 power electronics heat exchanger
180 air by-pass variable control valve
182 by-pass line
210 first fluid flow path
212 second fluid flow path
214 third fluid flow path
216 fourth fluid flow path
222 further heat exchange element
224 second heat exchange element
226 first heat exchange element
380/480 additional heat exchange element
412 second fluid flow path
418 fifth fluid flow path
590 further additional air cooled heat exchanger
610 tube (first fluid flow path)
612 second fluid flow path
614 third fluid flow path
626 first element
624 second element

The invention claimed is:

1. A method of altering the temperature of off-gases exiting at least one fuel cell stack, the at least one fuel cell stack having separate anode and cathode off-gas flow paths, the method comprising:
    passing separate anode off-gas from the at least one fuel cell stack and at least one heat transfer fluid through a first heat exchange element to exchange heat between the anode off-gas and the at least one heat transfer fluid;
    passing the separate anode off-gas from the first heat exchange element to a burner;
    passing the separate cathode off-gas exiting the at least one fuel cell stack into said burner; and
    burning the combined anode and cathode off-gases to produce burner off-gas; and passing burner off-gas and the at least one heat transfer fluid through a second heat exchange element to exchange heat between the burner off-gas and the at least one heat transfer fluid.

2. A method according to claim 1, wherein the first heat exchange element cools the anode off-gas and heats the at least one heat transfer fluid.

3. A method according to claim 1, wherein the second heat exchange element cools the burner off-gas and heats the at least one heat transfer fluid.

4. A method according to claim 3, wherein the cooled burner off-gas is output from the second heat exchange element to an exhaust.

5. A method according to claim 1, wherein condensate from the burner off-gas is formed in and output from the second heat exchange element.

6. A method according to claim 1, wherein the second heat exchange element receives the heat transfer fluid after it has been output from the first heat exchange element.

7. A method according to claim 2, wherein condensate from the anode off-gas is formed in and output from the first heat exchange element.

8. A method according to claim 1, wherein the at least one heat exchange fluid is chosen from a group comprising: water, refrigerant fluid, anti-freeze fluid, mixed fluids, fuel and air.

9. A method according claim 1, wherein the first heat exchange element receives a plurality of heat transfer fluids.

10. A method according to claim 9, further comprising independently controlling the rate of flow of each of the heat transfer fluids to optimize heat exchange to or from the heat transfer fluids.

11. A method according to claim 1, further comprising passing the separate anode off-gas through a further heat exchange element before it is received by the first heat exchange element, the further heat exchange element exchanging heat between the anode off-gas and a flow of fluid.

12. A method according to claim 11, the further heat exchange element cooling the anode off-gas and warming the flow of fluid.

13. A method according to claim 11, wherein the flow of fluid into the further heat exchange element is a flow of cathode side feed gas, which cathode side feed gas subsequently enters the at least one fuel cell stack and exits as the cathode off-gas.

14. A method according to claim 1, wherein the operating temperature of the fuel cell is between 450° C. and 650° C.

15. A method according to claim 5, wherein condensed water is recycled and used to reform fuel before it enters the fuel cell(s).

16. A fuel cell system, comprising:
- at least one fuel cell stack having separate outlets and flow paths for flow of anode and cathode off-gases respectively;
- a first heat exchange element coupled to receive anode off-gas which has been output from the at least one fuel cell stack anode off-gas outlet, the first heat exchange element for exchanging heat between the anode off-gas from the at least one fuel cell stack and the at least one heat transfer fluid;
- a burner configured to receive and combine anode off-gas exiting the first heat exchange element and cathode off-gas exiting the at least one fuel cell stack and combust same to produce burner off-gas; and
- further comprising a second heat exchange element, coupled to receive the heat transfer fluid and burner off-gas from the burner, the second heat exchange element for exchanging heat between the burner off-gas and the heat transfer fluid.

17. A fuel cell system according to claim 16, wherein the first heat exchange element is configured to cool the anode off-gas, and heat the heat transfer fluid.

18. A fuel cell system according to claim 17, the first heat exchange element being for reducing the operating temperature of the burner.

19. A fuel cell system according to claim 16, wherein the second heat exchange element is configured to cool the burner off-gas and heat the heat transfer fluid.

20. A fuel cell system according to claim 16, wherein the second heat exchange element comprises a condensing heat exchanger.

21. A fuel cell system according to claim 16, wherein the heat exchange fluid flow path is defined by the first heat exchange element followed by the second heat exchange element, for passing heat transfer fluid into, through and out of the first heat exchange element and subsequently into, through and out of the second transfer element.

22. A fuel cell system according to claim 16, wherein the second heat exchange element is adapted to receive a plurality of heat transfer fluids.

23. A fuel cell system according to claim 16, wherein the first heat exchange element comprises a condensing heat exchanger.

24. A fuel cell system according claim 16, wherein the first heat transfer exchange element is adapted to receive a plurality of heat transfer fluids.

25. A fuel cell system according to claim 16, further comprising a further heat exchange element coupled between the at least one fuel cell stack anode off-gas outlet and the first heat exchange element, for reducing the temperature of the anode off-gas before it enters the first heat exchange element.

26. A fuel cell system according to claim 25, wherein the further heat exchange element is a gas-gas heat exchanger.

27. A fuel cell system according to claim 25, wherein the first and further heat exchange elements are integrated into a single unit.

28. A fuel cell system according to claim 16, wherein the first and second heat exchange elements are integrated into a single unit.

29. A fuel cell system according to claim 16, wherein the fuel cell is a solid oxide fuel cell.

30. A fuel cell system according to claim 16, wherein the fuel cell is configured to operate between 450° C.-650° C.

31. A fuel cell system according to claim 20, wherein the system is configured to recycle water from the condensing heat exchanger(s) and provide the water to a reformer for reforming fuel before it enters the fuel cell(s).

32. A fuel cell system according to claim 16, configured to be operated in a marine environment.

33. A fuel cell system according to claim 16, configured to be operated in an automotive environment.

34. A fuel cell system according to claim 16, configured to be operated in an aeronautical environment.

35. In a fuel cell system having separate anode and cathode off-gas outlets and flow paths from at least one fuel cell stack, a heat exchanger system comprising:
- a first condensing heat exchange element coupled to receive anode off-gas from the anode off-gas outlet of the at least one fuel cell stack of the fuel cell system and heat transfer fluid, and output cooled anode off-gas, condensate from the anode off-gas and warmed heat transfer fluid from the first heat exchange element; and
- a burner coupled to the first heat exchange element to receive cooled anode off-gas from the first heat exchange element and cathode off-gas exiting the at least one fuel cell stack and combust same to produce burner off-gas; and
- a further heat exchange element coupled between the at least one fuel cell stack anode off-gas outlet and the first heat exchange element and coupled to receive cathode side feed gas before it enters the at least one fuel cell stack, for reducing the temperature of the anode off-gas before it enters the first heat exchange element, by exchanging heat with the cathode side feed gas.

36. In a fuel cell system having separate anode and cathode off-gas outlets and flow paths from at least one fuel cell stack, a heat exchanger system comprising:
- a first condensing heat exchange element coupled to receive anode off-gas from the anode off-gas outlet of the at least one fuel cell stack and heat transfer fluid, and output cooled anode off-gas, condensate from the anode off-gas and warmed heat transfer fluid from the first heat exchange element;
- a burner coupled to the first heat exchange element to receive cooled anode off-gas from the first heat exchange element and cathode off-gas exiting the at least one fuel cell stack and combust same to produce burner off-gas; and
- a second condensing heat exchange element coupled to receive burner off-gas, and the heat transfer fluid, and output cooled burner off-gas, condensate from the burner off-gas and warmed heat transfer fluid from the second heat exchange element.

37. In a fuel cell system having separate anode and cathode off-gas outlets and flow paths from at least one fuel cell stack, a heat exchanger system comprising:
- a first condensing heat exchange element coupled to receive anode off-gas from the anode off-gas outlet of the at least one fuel cell stack and heat transfer fluid, and output cooled anode off-gas, condensate from the anode off-gas and warmed heat transfer fluid from the first heat exchange element;

a burner coupled to the first heat exchange element to receive cooled anode off-gas from the first heat exchange element and cathode off-gas exiting the at least one fuel cell stack and combust same to produce burner off-gas;

a second condensing heat exchange element coupled to receive burner off-gas, and the heat transfer fluid, and output cooled burner off-gas, condensate from the burner off-gas and warmed heat transfer fluid from the second heat exchange element; and a further heat exchange element coupled in the anode off-gas fluid flow path between at least one fuel cell stack and the first heat exchange element, configured to reduce the temperature of the anode off-gas passing therethrough before it enters the first heat exchange element.

38. In a fuel cell system having separate anode and cathode off-gas outlets and flow paths from at least one fuel cell stack, a heat exchanger system comprising:

a first condensing heat exchange element coupled to receive anode off-gas from the anode off-gas outlet of the at least one fuel cell stack and at least one heat transfer fluid, and output cooled anode off-gas, condensate from the anode off-gas and warmed heat transfer fluid from the first heat exchange element; and a further heat exchange element coupled in the anode off-gas fluid flow path between at least one fuel cell stack and the first heat exchange element, configured to reduce the temperature of the anode off-gas passing therethrough before it enters the first heat exchange element, wherein the further heat exchange element receives a flow of cathode side feed gas, which subsequently enters the at least one fuel cell stack and exits as cathode off-gas.

39. A method of altering the temperature of off-gases exiting at least one fuel cell stack, the at least one fuel cell stack having separate anode and cathode off-gas flow paths, the method comprising:

passing separate anode off-gas from the at least one fuel cell stack and at least one heat transfer fluid through a first heat exchange element to exchange heat between the anode off-gas and the at least one heat transfer fluid;

passing the separate anode off-gas from the first heat exchange element to a burner;

passing the separate cathode off-gas exiting the at least one fuel cell stack into said burner to combine with the anode off-gas and combust to produce burner off-gas;

further comprising passing the separate anode off-gas through a further heat exchange element before it is received by the first heat exchange element, the further heat exchange element exchanging heat between the anode off-gas and a flow of fluid; and wherein the flow of fluid into the further heat exchange element is a flow of cathode side feed gas, which cathode side feed gas subsequently enters the at least one fuel cell stack and exits as the cathode off-gas.

40. A fuel cell system, comprising:

at least one fuel cell stack having separate outlets and flow paths for flow of anode and cathode off-gases respectively;

a first heat exchange element coupled to receive anode off-gas which has been output from the at least one fuel cell stack anode off-gas outlet, the first heat exchange element for exchanging heat between the anode off-gas from the at least one fuel cell stack and the at least one heat transfer fluid;

a burner configured to receive and combine anode off-gas exiting the first heat exchange element and cathode off-gas exiting the at least one fuel cell stack and combust same to produce burner off-gas; and a further heat exchange element coupled between the at least one fuel cell stack anode off-gas outlet and the first heat exchange element and coupled to receive cathode side feed gas before it enters the at least one fuel cell stack, for reducing the temperature of the anode off-gas before it enters the first heat exchange element, by exchanging heat with the cathode side feed gas.

* * * * *